Aug. 17, 1943.    C. A. LOVELL ET AL    2,327,277
ALTERNATING CURRENT GENERATOR
Filed May 21, 1941
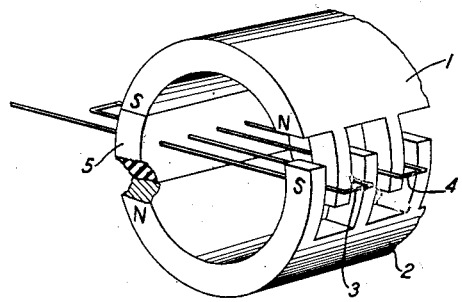
FIG. 1
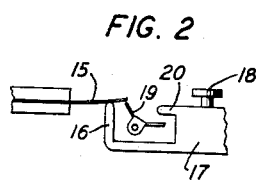
FIG. 2
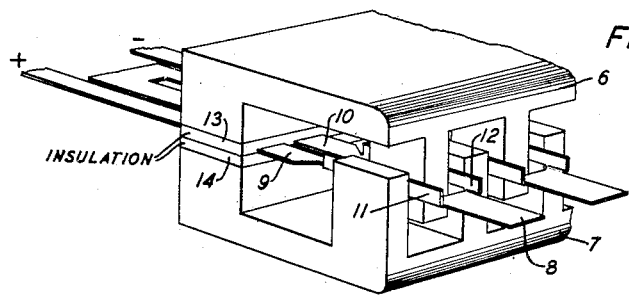
FIG. 3
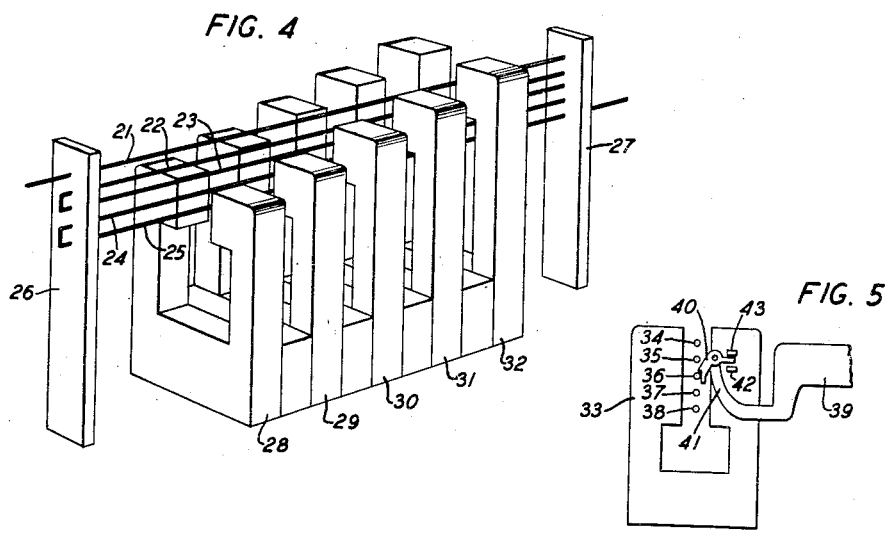
FIG. 4
FIG. 5
INVENTORS
C. A. LOVELL
R. F. MALLINA
D. B. PARKINSON
BY John Attall
ATTORNEY Patented Aug. 17, 1943

2,327,277

UNITED STATES PATENT OFFICE 2,327,277

ALTERNATING CURRENT GENERATOR

Clarence A. Lovell, Maplewood, N. J., Rudolph F. Mallina, Hastings on Hudson, N. Y., and David B. Parkinson, Maplewood, N. J., assignors to Bell Telephone Laboratories, Incorporated, New York, N. Y., a corporation of New York Application May 21, 1941, Serial No. 394,460

5 Claims. (Cl. 179—90)

This invention relates to signaling means and particularly to alternating current generators of the type used in telephones for generating alternating current dialing signals representing telephone station designations.

The object of the invention is to provide a simple efficient and economic device of small dimensions which will operate on electrodynamic principles. The alternating current generator of the present invention belongs in that class of generators used in communication systems for signaling by voice frequency alternating currents. Generally speaking, these generators comprise interlinked magnetic and electrical circuits operated by a plucked reed having a given natural period of vibration. Usually a plurality of such reeds are used each having a different natural period of vibration and the reeds are plucked in combinations whereby different signals may be transmitted, usually representing telephone station designations. Structurally these generators comprise interlinked magnetic and electrical circuits and are of the balanced type whereby none of the flux from the permanent magnet threads the reed or reeds. The permanent magnet, therefore, forms a simple magnetic circuit for steady flux and the reed and the permanent magnet form a multiple magnetic circuit for the varying flux set up by the vibration of the reed. Since the pick-up coil is wound about the reed, the electrical circuit therefore is interlinked only with the latter multiple magnetic circuit for the varying flux.

According to the present invention the pick-up coil is eliminated and the reed being of conducting material is constructed as a loop and acts in the dual capacity of reed and pick-up coil.

In one form of the invention the reed is made of spring wire which is bent in a hairpin shape. This is arranged so that in vibrating it moves through the field supplied by the permanent magnet though it forms no part of the permanent magnetic structure. Where a plurality of reeds are used the loops thus formed may be connected in series.

In another form the reed is formed of the ordinary material used for this purpose but instead of taking the usual form is cut away so as to have a double anchorage and thus effectually form a loop which by moving in the field of the permanent magnet acts on an electrodynamic principle and becomes a pick-up coil as well as the mechanically moving element of the generator.

In still another form of the invention the "reed" is in the form of a stretched string placed in the air-gap of the permanent magnet circuit and when set in vibration by plucking or striking again acts in the dual capacity of mechanically movable element of the generator and pick-up coil.

A feature of the invention is thus an alternating current generator having a simple magnetic circuit and a mechanically vibratable element moving in the field thereof which acts also as the electrical circuit of the said generator.

Another feature is an alternating current generator comprising a magnetic circuit for supplying a field and an electrical circuit comprising conductors movable in said field, said electrical circuit being in the form of resilient material arranged to vibrate at a given natural period of vibration under external mechanical control.

Still another feature is an alternating current generator comprising a field supplied by a permanent magnet with a plurality of vibratable reeds moving in said field, said reeds being so constructed and arranged that electromotive force induced in them through their movement in said field may be delivered to the outgoing terminals of said generator.

A further feature is an alternating current generator comprising a field energized by a permanent magnet and a plurality of stretched strings in said field each of said strings being tuned to vibrate at a different given frequency, said strings comprising the electrical circuit of said generator and external means for causing said strings to vibrate.

Another feature is a low impedance alternating current generator comprising a field energized by a permanent magnet, a plurality of vibratable elements serving the dual capacity of electrical conductors and tuned vibrators and mechanical means for selectively setting said vibrators in motion.

Other features will appear in the following description.

The drawing consists of a single sheet having five figures as follows:

Fig. 1 is a perspective view partly in section showing an electrodynamic reed generator in which the reeds consist of bent wires;

Fig. 2 is a schematic representation of a reed plucking means;

Fig. 3 is a perspective view of an electrodynamic reed generator in which the reeds are formed of punched metal;

Fig. 4 is a perspective schematic view of the essential elements of a stretched string electrodynamic generator; and Fig. 5 is a schematic view of an arrangement whereby the strings of the generator shown in Fig. 4 may be set in vibration.

Alternating current generators of this type are intended for use primarily in telephone substation sets for sending switch setting impulses. Such generators usually consist of five reeds each tuned to a different natural period of vibration and the reeds are plucked in different combinations so that through a permutation code definite signals each representing a different digit of a telephone number may be transmitted from the substation to the central office at the distant end of the telephone line to set up connections to other wanted lines. The general appearance and operation of these generators may be found in Patent No. 2,147,710, granted February 21, 1939 to R. F. Mallina.

The generator of the present invention operates on the electrodynamic principle, that is, the reeds on the vibrating elements act both in the capacity of the moving element and the pick-up circuit, no separate pick-up coil being provided as in the above-noted patent.

In Fig. 1 a pair of elements 1 and 2 are constructed of permanent magnetic material. At one end these permanent magnets each has a plurality of teeth which are meshed but spaced from each other sufficiently to allow the wire reeds to freely move between such teeth. These teeth are so constructed and arranged that the flux flows in a direction at right-angles to the direction of the teeth and at right-angles to the direction of movement of the reeds when in vibration. The reeds 3 and 4 are formed of bent wires having a high coefficient of elasticity. As indicated, the wires forming the various reeds are connected in series, thus forming a low impedance path to the terminals of the generator which may be connected to the telephone substation circuit in any appropriate manner. Each reed is of a different length and thus has a different natural period of vibration. The wire reeds are mounted in a piece of insulation 5. When any one of these reeds is plucked and thereby set into vibration, its movement between the teeth of the permanent magnets 1 and 2 results in the production by induction of an alternating current in the reed of the same frequency as the natural period of vibration of the plucked reed. The alternating current thus produced may be used for any appropriate purpose.

In Fig. 3 an alternative arrangement is shown in which the material usually employed for forming vibrating reeds is punched and formed effectively into a loop which is interlinked with the teeth of the permanent magnets 6 and 7. The reed terminates in a tongue 8 and has two base portions 9 and 10 connected to the tongue by integral upset portions 11 and 12. The base portions extend through insulation pieces 13 and 14 and are joined electrically in a series circuit in the same manner and for the same purposes as the wire reeds of Fig. 1. When the reed 8 is set in vibration an alternating current of the same frequency as the natural period of vibration of the reed will be induced in the reed and delivered to the output of the generator.

Fig. 2 is a schematic representation of a reed plucking device. The reed 15 is normally stressed upwardly by the finger 16 of the key-bar 17. When the buttom 18 is depressed the reed is freed by the finger 16 but is temporarily held in its stressed position by the pawl member 19. As the key-bar 17 is further depressed the finger 20 engages the pawl member 19 and rotates it in a clockwise direction so that the pawl member snaps away from the reed 15 and allows it to freely vibrate.

Fig. 4 shows a perspective and schematic arrangement of a device using stretched strings acting in the dual capacity of a vibrating member and a pick-up coil. The five strings 21, 22, 23, 24, and 25 of conducting material are represented as being supported by the members 26 and 27. These supports represent any known means whereby the strings may be supported and stretched—each to a different degree so that each will be tuned to vibrate at a different frequency. They may all be connected in series as indicated. There is a magnetic structure, here represented as an organization of five permanent magnets 28, 29, 30, 31, and 32 so arranged that upon vibration string 25 will move through the field supplied by magnet 28 and so forth. This particular arrangement is shown as one means whereby the string plucking devices may be practically arranged, but any other arrangement whereby the strings may be made to vibrate in a field of flux comes within the spirit of the present invention.

Fig. 5 is a schematic arrangement of a string plucking device. The part 33 represents a means for supplying a field for the strings 34, 35, 36, 37 and 38. For each string there is a plucking device such as that shown for string 36. This device consists of an arm 39 movable downwardly as by a key or button or means controlled by a key or button. As the arm 39 moves downwardly a member 40 pivoted on the finger 41 of the arm 39 engages the string 36 and forces it downwardly. Further movement of the arm 39 causes the tail-piece of the member 40 to engage a stop 42 whereby the member 40 is rotated in a counter-clockwise direction so that it snaps away from the strings 36 and allows the string to freely vibrate at its own natural period at right-angles to the field set up by the magnetic structure 33. An alternating current of the same frequency as the natural period of vibration of the string is thus induced in the string and may be led from the terminals of the generator to any desired load circuit. On the restoring movement of the arm 39 the stop 43 rotates the member 40 in a clockwise direction until the parts assume the position in which they are shown.

It is intended that this specification will cover other modifications of this device which come within the spirit of this invention and the scope of the following claims.

What is claimed is:

1. An electrodynamic alternating current generator comprising a permanent magnet for supplying a field, an electrical circuit comprising conductors in said field formed of resilient wire into a series of loops each said loop constituting a separate reed having a different given natural period of vibration, and mechanical means for selectively plucking said reeds.

2. An electrodynamic alternating current generator comprising a permanent magnet for supplying a field, an electrical circuit comprising conductors in said field formed of resilient sheet metal cut and bent into a plurality of reeds each having a different given natural period of vibration, each said reed having a bifurcated fixed end and electrically constituting a loop, and mechanical means for selectively plucking said reeds.

3. In a signaling system, means for producing signals comprising permutations of a plurality of different frequency alternating currents, comprising interlinked magnetic and electrical circuits, said electrical circuit comprising a plurality of loops of resilient material anchored at their double end and free to vibrate at their single end, each said loop being tuned to have a different natural period of vibration, and means for selectively plucking said loops at their free ends.

4. An electrodynamic alternating current generator comprising a pair of permanent magnets provided with meshing toothed ends, a plurality of reed members each formed into a loop and anchored at their double ends, each said loop encircling a tooth of one of said magnets and arranged to vibrate in a direction parallel to the sides of said teeth whereby in vibration each will move at right angles to the field between said meshed teeth, said reed members each being tuned to a different natural period of vibration, and means for selectively plucking said reed members.

5. An electrodynamic alternating current generator comprising a pair of permanent magnets provided with meshing toothed ends, a plurality of reed members of resilient sheet metal cut and bent into a loop and anchored at their double ends, each said loop encircling a tooth of one of said magnets and arranged to vibrate in a direction parallel to the sides of said teeth whereby in vibration each will move at right angles to the field between said meshed teeth, said reed members each being tuned to a different natural period of vibration, and means for selectively plucking said reed members.

CLARENCE A. LOVELL.
RUDOLPH F. MALLINA.
DAVID B. PARKINSON.